United States Patent
Speer

(10) Patent No.: US 9,986,676 B2
(45) Date of Patent: Jun. 5, 2018

(54) MOWING DEVICE WITH A WORKING CONFIGURATION AND A TRANSPORT CONFIGURATION AND A METHOD OF OPERATION

(71) Applicant: CLAAS SAULGAU GMBH, Bad Saulgau (DE)

(72) Inventor: Christian Speer, Bad Saulgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 409 days.

(21) Appl. No.: 14/948,629

(22) Filed: Nov. 23, 2015

(65) Prior Publication Data

US 2016/0150717 A1    Jun. 2, 2016

(30) Foreign Application Priority Data

Dec. 1, 2014   (DE) .......................... 10 2014 117 583

(51) Int. Cl.
    *A01B 73/04*    (2006.01)
    *A01D 75/30*    (2006.01)
    (Continued)

(52) U.S. Cl.
    CPC .......... *A01B 73/044* (2013.01); *A01B 59/042* (2013.01); *A01D 34/001* (2013.01); *A01D 75/303* (2013.01)

(58) Field of Classification Search
    CPC ..... A01B 73/00–73/067; A01B 59/042; A01D 34/001; A01D 34/664; A01D 41/144; A01D 67/00; A01D 67/005; A01D 75/30; A01D 75/303; A01D 75/306; A01D 75/004; A01D 75/006; A01D 82/00; A01D 89/004
    See application file for complete search history.

(56) References Cited

U.S. PATENT DOCUMENTS 4,425,971 A  *  1/1984  Allen ...................... A01B 73/02
                                                       172/311
4,854,112 A  *  8/1989  Holley ................... A01D 75/30
                                                       172/269
(Continued)

FOREIGN PATENT DOCUMENTS

EP        1 405 556        4/2004
EP        1616474          1/2006
(Continued)

*Primary Examiner* — Alicia Torres
*Assistant Examiner* — Adam J Behrens
(74) *Attorney, Agent, or Firm* — Collard & Roe, P.C.

(57) ABSTRACT

A mowing device has an elongate frame with opposing longitudinal ends and two mowing units disposed on opposite longitudinal sides of the frame. Each mowing unit has an elongate support with a first pivot joint (G1) by which a first of the opposing longitudinal ends of the support is hinged on one of the longitudinal sides to pivot about a horizontal rotational axis (A) extending in the longitudinal direction (LR1) of the frame. A bar-shaped mower is hinged on a second the opposing longitudinal ends of the support in order to extend, in a working position, longitudinally horizontally and transversely to the longitudinal direction (LR1). A second pivot joint (G2) provides a rotational axis (A2) that extends vertically, transversely to the first rotational axis (A1) to allow for mower pivoting to a transport position.

7 Claims, 6 Drawing Sheets

(51) Int. Cl.
*A01B 59/042* (2006.01)
*A01D 34/00* (2006.01)

(56) References Cited

U.S. PATENT DOCUMENTS

| | | | | | |
|---|---|---|---|---|---|
| 5,069,022 | A * | 12/1991 | Vandermark | .......... | A01D 75/30 56/15.5 |
| 5,133,174 | A * | 7/1992 | Parsons, Jr. | ............ | A01D 75/30 56/10.9 |
| 6,526,735 | B2 * | 3/2003 | Meyer | .................. | A01D 75/303 56/6 |
| 6,662,539 | B1 * | 12/2003 | Adams | ................... | A01D 57/30 56/158 |
| 6,688,093 | B1 * | 2/2004 | Franet | .................. | A01B 51/026 56/15.3 |
| 7,310,929 | B2 * | 12/2007 | Dow | ...................... | A01B 73/02 172/311 |
| 7,610,741 | B2 * | 11/2009 | Halter | .................... | A01D 57/20 56/228 |
| 7,673,439 | B2 * | 3/2010 | Geiser | ................... | A01B 73/02 56/192 |
| 7,828,071 | B2 * | 11/2010 | Breneur | ................. | A01B 73/02 172/311 |
| 7,861,795 | B2 * | 1/2011 | Dillon | ................... | A01B 73/02 172/311 |
| 8,001,755 | B2 * | 8/2011 | Menichetti | ........... | A01D 78/144 56/228 |
| 8,863,489 | B2 * | 10/2014 | Landon | .................. | A01D 57/28 56/192 |
| 9,198,341 | B2 * | 12/2015 | Halter | .................. | A01B 73/044 56/6 |
| 2002/0174634 | A1 * | 11/2002 | Franet | .................. | A01D 34/661 56/7 |
| 2006/0174599 | A1 * | 8/2006 | Hironimus | .......... | A01D 75/303 56/6 |
| 2009/0107100 | A1 * | 4/2009 | Bollinger | ............... | A01D 34/64 56/218 |
| 2012/0247078 | A1 * | 10/2012 | Landon | .................. | A01D 57/28 56/192 |
| 2014/0033671 | A1 * | 2/2014 | Halter | .................. | A01B 73/044 56/255 |
| 2015/0020492 | A1 * | 1/2015 | Schwer | .................. | A01B 63/24 56/377 |
| 2015/0223397 | A1 * | 8/2015 | Browning | .............. | A01D 34/76 56/17.1 |
| 2017/0172054 | A1 * | 6/2017 | Sammut | ................ | A01B 73/067 |

FOREIGN PATENT DOCUMENTS

| | | | | |
|---|---|---|---|---|
| EP | 2042025 A1 | * | 4/2009 | ............ A01D 57/20 |
| EP | 2 055 174 | | 5/2009 | |
| GB | 2505461 | | 3/2014 | |

* cited by examiner

MOWING DEVICE WITH A WORKING CONFIGURATION AND A TRANSPORT CONFIGURATION AND A METHOD OF OPERATION

CROSS-REFERENCE TO A RELATED APPLICATION

The invention described and claimed hereinbelow is also described in German Patent Application DE 10 2014 117 583.2, filed on Dec. 1, 2014. The German Patent Application, the subject matter of which is incorporated herein by reference, provides the basis for a claim of priority of invention under 35 U.S.C. 119(a)-(d).

BACKGROUND OF THE INVENTION

The present invention relates to a mowing device to be coupled to the rear of a self-propelled working machine and to a method for operating such a mowing device.

A mowing device to be coupled to the rear of a self-propelled working machine and trailed is known from EP 1 616 474 B1. The mowing device comprises an elongate frame and two mowing units, which are disposed on two opposite longitudinal sides of the frame. The frame has a longitudinal end to be coupled to a rear of the working machine in such a way that the frame extends longitudinally behind the working machine. Each of the two mowing units includes an elongate support and a bar-shaped mower.

The support has a first pivot joint, via which a first longitudinal end of the support is hinged on the particular longitudinal side of the frame so as to pivot about a first rotational axis extending in the longitudinal direction of the frame and transversely to a longitudinal direction of the support (i.e., a rotational axis extending horizontally and along the frame). The mower is hinged on a second longitudinal end of the support facing away from the first longitudinal end so as to extend, in a working position of the mowing unit, longitudinally horizontally and transversely to the longitudinal direction of the frame. Each of the two mowing units also includes a second pivot joint, which provides a second rotational axis for the support extending transversely to the first rotational axis and transversely to the longitudinal direction of the support (i.e., a vertically extending rotational axis), about which second rotational axis the mower can be pivoted, for a transport position of the mowing unit, in such a way that said mower extends longitudinally in the longitudinal direction of the frame.

In this mowing device, the first and the second pivot joints are disposed close to one another on the frame and the support is designed as one piece. When the mowing units are moved out of the working position, in which the respective mower thereof extends widthwise and lengthwise horizontally and longitudinally transversely to the longitudinal direction of the frame, into the transport position, the following steps are carried out.

Raise the mower by pivoting the support vertically upward through a certain pivoting angle about the first rotational axis; pivot the support through approximately 90 degrees about the second rotational axis toward a rear longitudinal end of the frame, which is opposite the longitudinal end of the frame intended to be coupled to the rear of the working machine, until the mower extends longitudinally in the longitudinal direction of the frame, and lower the mower onto a support device at the rear longitudinal end of the frame by pivoting the support vertically downward through a certain pivoting angle about the first rotational axis. In the transport position of the particular mowing unit, the mower thereof therefore extends widthwise and lengthwise horizontally and longitudinally toward the rear in the longitudinal direction of the frame.

When such a trailed mowing device is designed as a large-surface area mowing device having a working width of more than 10 meters, the bar-shaped mowers of the mowing units thereof should have a length of more than 4 meters. If such large mowers were to be folded lengthwise in the vertical direction, the mowing device would substantially exceed a maximum transport height (e.g., 4 meters), which is permissible for road transport.

The aforementioned problem is solved by the mowing device known from EP 1 616 474 B1, since, in the transport position in this case, the mowers of the mowing units are pivoted toward the rear about 90 degrees. However, in the transport position, the mowers of the mowing units lie next to one another widthwise on the support device of the frame in such a way that the respective widths thereof are limited so as to not exceed a transport width of the mowing device (e.g., an overall width of 3 meters) which is permissible for road transport.

SUMMARY OF THE INVENTION

The present invention overcomes the shortcomings of known arts, such as those mentioned above.

The invention provides a mowing device and a method for operating such a mowing device, which make it possible to obtain a wider width of the mowers when a working width is greater than 10 meters, while complying with a maximum transport height and transport width.

According to the invention, a mowing device to be coupled to the rear of a self-propelled working machine, such as a tractor, is provided. The mowing device comprises an elongate frame and two mowing units, which are disposed or mounted on two opposing longitudinal sides of the frame. The frame has a longitudinal end to be coupled to a rear of the working machine in such a way that the frame extends longitudinally behind the working machine. Each of the two mowing units includes an elongate support and a bar-shaped mower.

The support has a first pivot joint, via which a first longitudinal end of the support is hinged on the particular longitudinal side of the frame so as to pivot about a first rotational axis extending in the longitudinal direction of the frame and transversely to a longitudinal direction of the support (i.e., a rotational axis extending horizontally and along the frame). The mower is hinged on a second longitudinal end of the support facing away from the first longitudinal end so as to extend, in a working position of the mowing unit, longitudinally horizontally and transversely to the longitudinal direction of the frame. Each of the two mowing units also includes a second pivot joint, which provides a second rotational axis for the support extending transversely to the first rotational axis and transversely to the longitudinal direction of the support (i.e., a rotational axis which extends vertically in the working position), about which second rotational axis the mower can be pivoted, for a transport position of the mowing unit, in such a way that said mower extends longitudinally in the longitudinal direction of the frame.

One or the distinguishing features of the mowing device according to the invention is that in each of the two mowing units, the second pivot joint is disposed between a first and a second longitudinal end of the support with predetermined spacing from the first pivot joint in such a way that the support is formed by two support parts, which are interconnected via the second pivot joint.

Due to this two-part configuration of the support and this separated arrangement of the first and the second pivot joints, the mower can be displaced about the second rotational axis, in order to move the mowing units out of the working position (in which the respective mower thereof extends widthwise and lengthwise horizontally and longitudinally transversely to the longitudinal direction of the frame, into the transport position) in such a way that the mower extends longitudinally in the longitudinal direction of the frame and, in addition, is displaced about the first rotational axis in such a way that the width of the mower is rotated vertically.

Therefore, in the transport position, the mowers of the mowing unit are disposed on edge widthwise next to one another in such a way that a transport width of the mowing device, in the transport position, is determined by the sum of the particular heights of the mowers. Since the widths of the particular mowers extend vertically in the transport position, a greater width of the mowers also is made possible when a working width is greater than 10 meters, while complying with a maximum transport height and transport width. As a result, it is possible to dispose processing devices and/or cross auger devices for the crop behind the mowing device, as viewed in the working direction, without increasing the transport width. Roller conditioners or tine conditioners, for example, can be provided as processing devices, and conveyor belts can be provided as cross auger devices.

According to one embodiment of the invention, in the case of each of the two mowing units, a first support part of the two support parts of the support, which first support part is disposed between a first and a second pivot joint, is angled and oriented in such a way that an obtuse interior angle of the angling thereof faces the mower and a first leg of the first support part disposed at the second pivot joint extends horizontally in the working position. Therefore, in the working position, a second leg of the first support part disposed at the first pivot joint extends obliquely downward, whereby the first rotational axis and, therefore, the center of gravity of the mowing unit, are displaced downward. This provides the mowing device with greater lateral tilt stability. In the case of each of the two mowing units, the interior angle of the angling of the first support part is preferably between 110 degrees and 130 degrees.

In the case of each of the two mowing units, a length of the first leg of the first carrier part is preferably at least half of a width of the mower. Therefore, a pivot position of the mower on the second longitudinal end of the support is provided approximately in the center relative to the width of the mower, since, in the transport position, the first leg of the first support part substantially provides, along the length thereof, the necessary spacing of the mower from the first pivot joint. The central pivot position makes it possible to optimize the stability and the mowing properties of the mowing device.

According to another embodiment of the invention, the first pivot joint of each of the two mowing units is disposed in such a way that the first rotational axis extends adjacent to a lower longitudinal edge of the longitudinal side with lateral spacing from the particular longitudinal side of the frame.

This arrangement of the first rotational axis makes it possible for the second leg of the first support part, in the transport position, to lie obliquely in the lateral spacing from the particular longitudinal side of the frame and, therefore, for the first leg of the first support part, in the transport position, to pivot further toward the frame. Therefore, the lateral tilt stability in the transport position is further increased and the transport width in the transport position is reduced.

Preferably, in the case of each of the two mowing units, the lateral spacing of the first rotational axis from the particular longitudinal side of the frame is dimensioned in such a way that, for the transport position of the mowing unit, a second leg of the first support part disposed at the first pivot joint can be pivoted toward the articulating longitudinal side of the frame until the first leg of the first support part, when oriented longitudinally vertically, rests against this longitudinal side of the frame.

Given that the first leg of the first support part rests against the articulating longitudinal side of the frame, the support part, in the transport position, advantageously receives additional support or positional fixation in the transverse direction of the frame, whereby the lateral tilt stability is further increased.

According to another embodiment of the invention, the second pivot joint of each of the two moving units is oriented in such a way that a second support part (disposed between the second pivot joint and the mower) of the two support parts of the support is pivoted in the direction toward another longitudinal end of the frame opposite the one longitudinal end of the frame, for the transport position of the mowing unit. Therefore, the particular mower is advantageously pivoted toward the rear for the transport position.

According to another embodiment of the invention, the second support part of each of the two mowing units is angled and is oriented in such a way that, in the working position of the mowing unit, an obtuse internal angle of the angling thereof faces the mower and a first leg of the second support part disposed at the second pivot joint extends horizontally. Therefore, a second leg of the second support part disposed on the mower extends obliquely downward in the working position, whereby the mower is brought advantageously close to the ground during mowing. In addition, the second leg of the second support part therefore advantageously provides spacing from the first support part for the pivoting between the working position and the transport position in order to reliably prevent a collision with this first support part and to reliably prevent frictional contact.

The internal angling of the second support part is approximately between 110 degrees and 130 degrees. In addition, the internal angle of the angling of the second support part is approximately just as large as the internal angle of the angling of the first support part.

The mowing device comprises at least one support wheel, which is disposed on the frame with spacing from one longitudinal end in order to support the frame on the ground for movement in the longitudinal direction of the frame. According to the embodiments of the invention, the mowing device is therefore designed as a trailed mowing device.

The invention also provides a method (an operating method) for operating a mowing device according to one, several, or all of the above-described embodiments of the invention in any conceivable combination. The operating method serves to move at least one mowing unit of the mowing device out of the working position, in which the mower extends widthwise and lengthwise horizontally and longitudinally transversely to the longitudinal direction of the frame, into the transport position, in which the width of the mower is rotated vertically and the mower extends longitudinally in the longitudinal direction of the frame.

The operating method comprises at least the following steps:

raising the mower into a headland position by pivoting the support upward through a predetermined first angular pitch about the first rotational axis;

pivoting one support part of the two support parts of the support disposed between the second pivot joint and the mower through a predetermined partial pivot angle of approximately 30 to 60 angular degrees about the second rotational axis toward one longitudinal end of the frame, which is disposed opposite the longitudinal end of the frame intended to be coupled to the rear of the working machine;

pivoting the support vertically upward through a predetermined second angular pitch about the first rotational axis until the width of the mower has been vertically rotated, and pivoting the support part of the two support parts of the support disposed between the second pivot joint and the mower through a predetermined second partial pivot angle about the second rotational axis toward the longitudinal end of the frame until the mower extends longitudinally in the longitudinal direction of the frame.

Therefore, in the transport position, the mowers of the mowing unit are disposed on edge widthwise next to one another in such a way that a transport width of the mowing device, in the transport position, is determined by the sum of the particular heights of the mowers. Since the widths of the particular mowers extend vertically, in the transport position, a greater width of the mowers also is made possible when a working width is greater than 10 meters, while complying with a maximum transport height and transport width.

Initially raising the mower about the first rotational axis only up to the headland position and subsequently pivoting the outer support part only through a predetermined partial pivot angle about the second rotational axis advantageously makes it possible to avoid a collision with the wheel of the chassis. In addition, the center of gravity of the mower thereby assumes a lower height, and therefore the tendency of the mowing device to tilt is reduced. Moreover, the center of gravity of the mower, which is only partially pivoted toward the rear, has a shorter lever than the first rotational axis, and therefore less force needs to be applied to raise the support into the vertical final position.

The invention also expressly extends to embodiments that are not given by combinations of features from explicit back-references of the claims, and therefore the disclosed features of the invention can be combined with one another in any manner, to the extent this is technically meaningful.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

Figure 1:
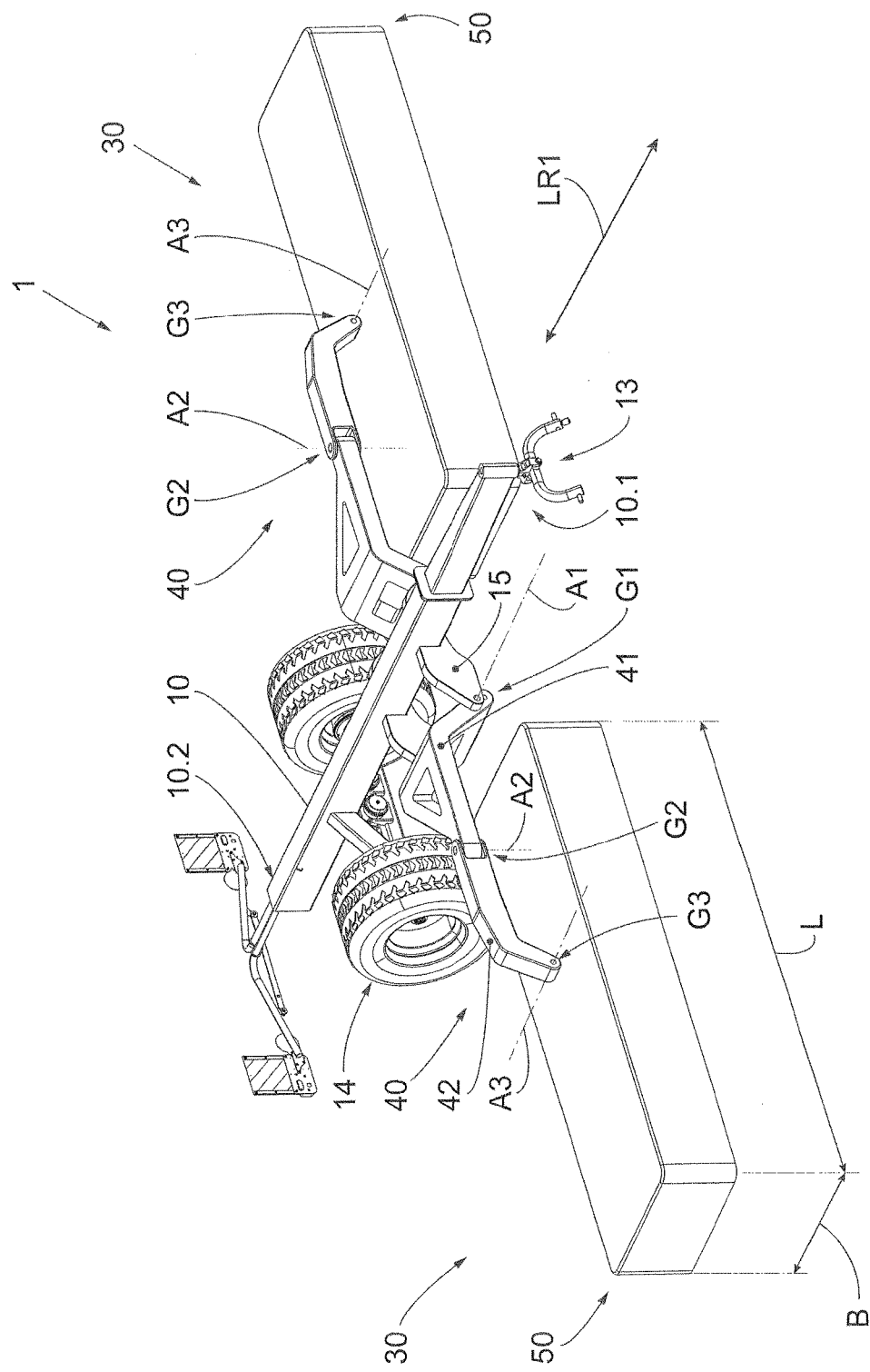
FIG. 1 presents a perspective view of one embodiment of a mowing device according to invention that is arranged in a working position.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A mowing device 1 to be coupled to the rear of a self-propelled working machine, such as a tractor (not shown), and a method for operating the mowing device 1 are described in the following with reference to FIGS. 1 to 10.

The mowing device 1 comprises an elongate frame 10 and two mowing units 30, which are identically designed as mirror images with respect to a longitudinal axis of the frame 10 and are disposed or mounted in a line on two opposing longitudinal sides 11, 12 of the frame 10.

A front longitudinal end 10.1 of the frame 10 is provided with a coupling 13, via which the front longitudinal end 10.1 of the frame 10 is coupled to a rear of the working machine in such a way that the frame 10 extends longitudinally behind the working machine. A wheel arrangement 14 having two support wheels (not labeled separately), as the chassis, is mounted on the frame 10 with spacing from the front longitudinal end 10.1 of the frame 10 and adjacent to a rear longitudinal end 10.2 of the frame 10 opposite the front longitudinal end 10.1, in order to support the frame 10 on the ground for movement in the longitudinal direction LR1 of the frame. According to the described embodiment, the mowing device 1 is therefore designed as a trailed mowing device.

Each of the two mowing units 30 comprises an elongate, two-part support 40 and a bar-shaped mower 50 having a predetermined length L and width B. According to the described embodiment, the mowing device 1 is designed as a large-surface area mowing device having a working width of more than 10 meters, wherein the length L of each bar-shaped mower 50 is greater than 4 meters. According to the described embodiment, in addition, the width B of each bar-shaped mower 50 is greater than 1.5 meters.

The support 40 of each mowing unit 30 comprises a first support part 41 and a second support part 42. The first support part 41 forms a first longitudinal end 40.1 of the support 40 and, by means of this first longitudinal end 40.1, is hinged on the respective longitudinal side 11, 12 of the frame 10 via a first pivot joint G1 so as to be pivotable about a first rotational axis A1 extending parallel to the longitudinal direction LR1 of the frame 10 and transversely to a longitudinal direction LR2 of the support 40 (i.e., a rotational axis extending horizontally and along the frame 10).

The second support part 42 forms a second longitudinal end 40.2 of the support 40 facing away from the first longitudinal end 40.1 and is connected to the first support part 41 via a second pivot joint G2, which is disposed between the first and the second longitudinal ends 40.1, 40.2 of the support 40 with predetermined spacing from the first pivot joint G1. The second pivot joint G2 provides a second rotational axis A2 for the support 40 or the second support part 42 thereof, which second rotational axis extends transversely to the first rotational axis A1 and transversely to the longitudinal direction LR2 of the support 40 (i.e., a rotational axis extending vertically in each of the FIGS. 1 to 3).

The mower 50 is pivotably hinged on the second longitudinal end 40.2 of the support 40, which second longitudinal end is defined by the second support part 42, via a third pivot joint G3. The third pivot joint G3 provides a third rotational axis A3, which extends parallel to the longitudinal direction LR1 of the frame 10 and to the first rotational axis A1 (i.e., a rotational axis extending horizontally and along the frame 10), for the mower 50 in order to support a flexible adaptation to ground contours by the mower 50 during operation of the mowing device 1.

Figure 2:
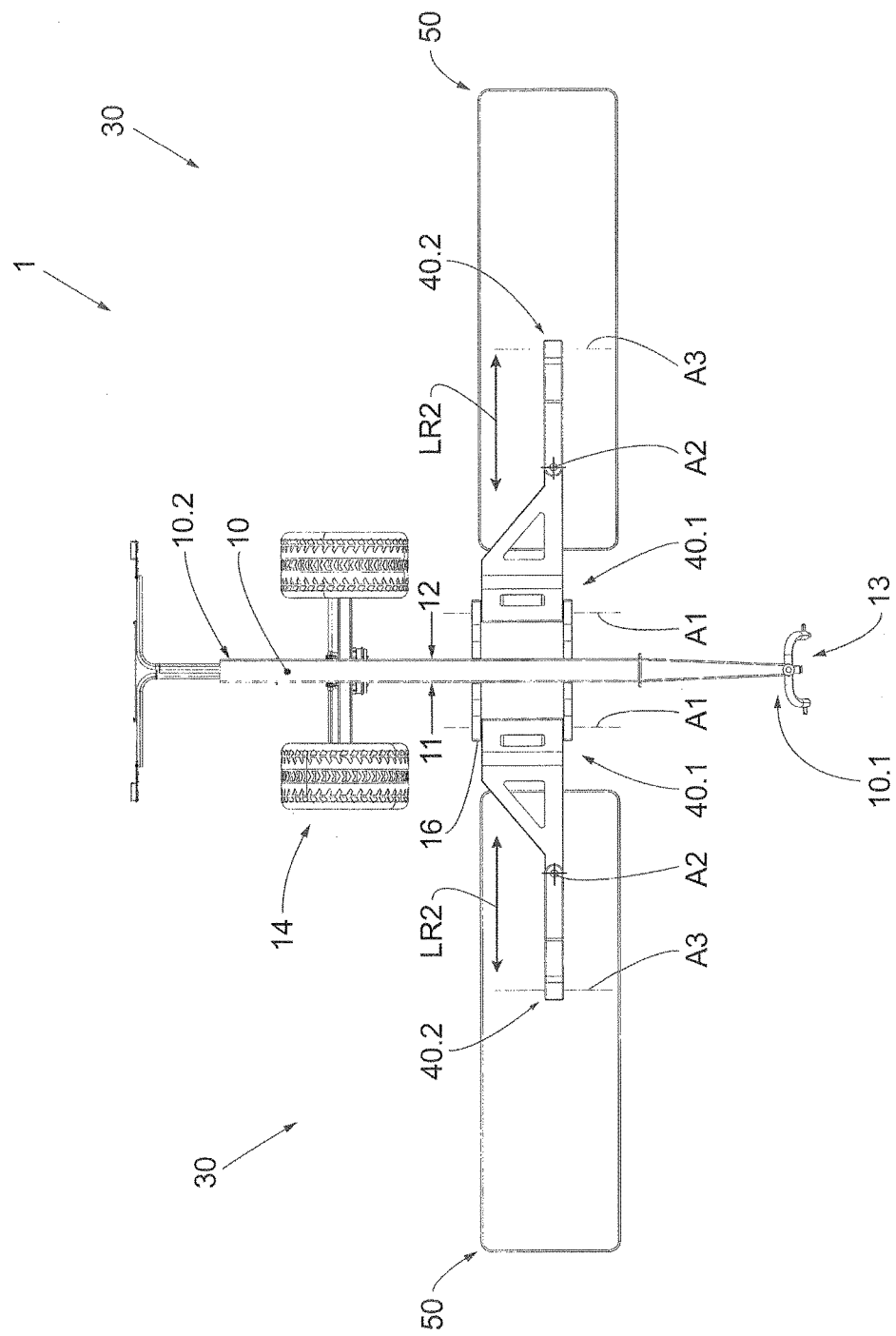
FIG. 2 presents a top view of the mowing device depicted in FIG. 1.
Figure 3:
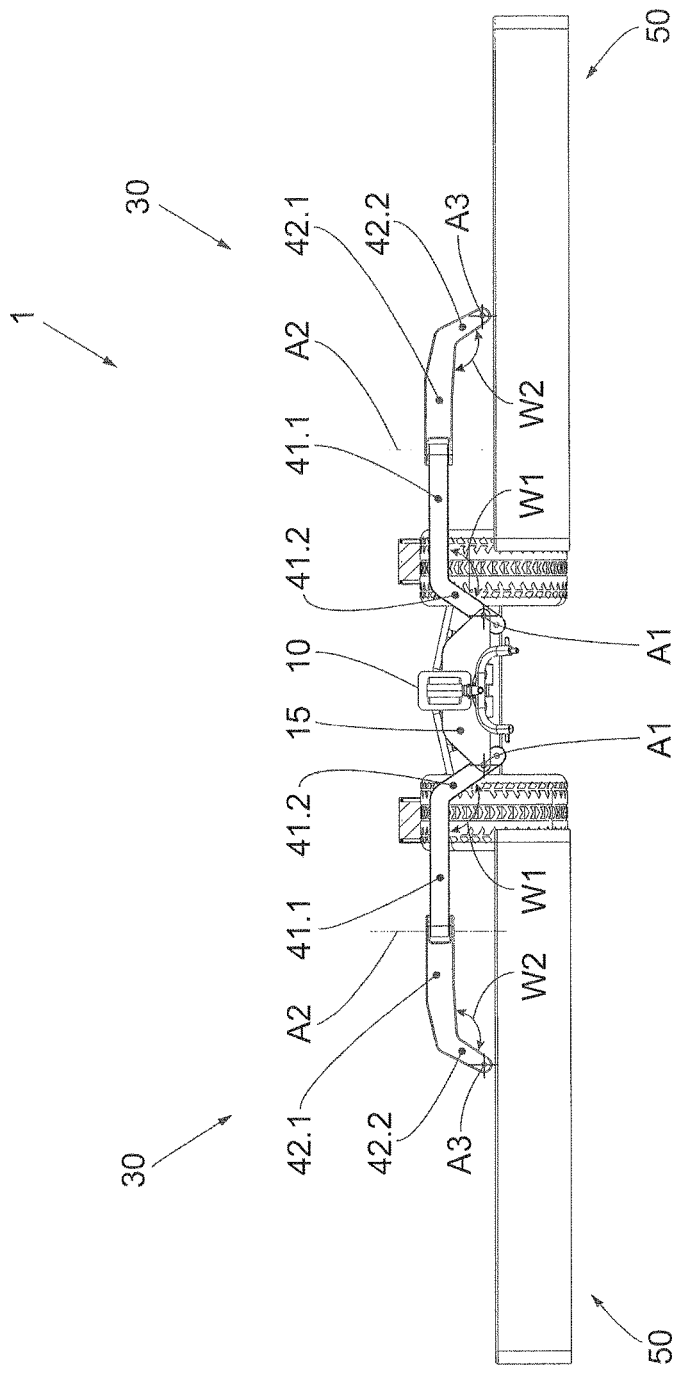
FIG. 3 presents a front view of the mowing device depicted in FIG. 1.

As is evident in FIGS. 1 to 3, in the case of each of the two mowing units 30, the first support part 41 of the support 40 disposed between the first pivot joint G1 and the second pivot joint G2 is angled and comprises a first leg 41.1 disposed at the second pivot joint G2 and a second leg 41.2, which is disposed at the first pivot joint G1 and is angled with respect to said first leg. A length of the first leg 41.1 of the first support part 41 corresponds, in this case, to at least half the width B of the mower 50 and, according to the embodiment shown, is designed to be larger than half the width B of the mower 50.

The first and the second leg 41.1, 41.2 of the first support part 41 mutually enclose, via the angling thereof, an obtuse first internal angle W1, wherein the first internal angle W1 faces the mower 50. The first internal angle W1 of the angling of the first support part 41 is between 110 degrees and 130 degrees and, preferably, is approximately 120 degrees.

As is further evident in FIGS. 1 to 3, in the case of each of the two mowing units 30, the second support part 42 of the support 40 disposed between the second pivot joint G2 and the third pivot joint G3 and the mower 50 is be angled and comprises a first leg 42.1 disposed at the second pivot joint G2 and a second leg 42.2, which is disposed at the third pivot joint G3 and is angled with respect to said first leg.

The first and the second leg 42.1, 42.2 of the second support part 42 mutually enclose, via the angling thereof, an obtuse second internal angle W2, wherein the second internal angle W2 faces the mower 50. The second internal angle W2 of the angling of the second support part 42 is between 110 degrees and 130 degrees and, preferably, is approximately 120 degrees. It is also preferable for the second internal angle W2 to be just as large as the first internal angle W1.

As is further evident in FIGS. 1 to 3, in the case of each of the two mowing units 30, the first pivot joint G1 is disposed in such a way that the first rotational axis A1 extends adjacent to a lower longitudinal edge of the longitudinal side 11, 12 with lateral spacing from the respective longitudinal side 11, 12 of the frame. For this purpose, two bearing bridges 15, 16 are welded onto an underside of the frame 10. Each bearing bridge 15, 16 provides a laterally protruding bearing tongue for the first pivot joint G1 located on one longitudinal side 11 of the frame 10 and a laterally protruding bearing tongue for the first pivot joint G1 located on the other longitudinal side 12 of the frame 10. Each first pivot joint G1 therefore comprises two bearing tongues on the frame 10, which bearing tongues protrude transversely to the longitudinal direction LR1 and are spaced apart in the longitudinal direction LR1 of the frame. Between the bearing tongues, the first longitudinal end 40.1 of the support 40 defined on the second leg 41.2 of the first support part 41 is pivotably mounted, e.g., by an axle part inserted therethrough (not shown).

FIGS. 1 to 3 show the mowing device 1 and the two mowing units 30 thereof in a working position. As is evident in FIGS. 1 to 3, the mower 50 of each mowing unit 30, in the working position, extends via the length L thereof and the width B thereof horizontally and longitudinally transversely to the longitudinal direction LR1 of the frame 10. In addition, in the working position, the first legs 41.1, 42.1 of the first and the second support parts 41, 42 of the support each extend longitudinally or via the length thereof horizontally or substantially horizontally. In addition, in the working position of the support 40, each of the two mowing units 30 extends, in the flat configuration (i.e., not bent at the second pivot joint G2), longitudinally or with respect to the longitudinal direction LR2 thereof transversely to the longitudinal direction LR1 of the frame 10.

Figure 6:
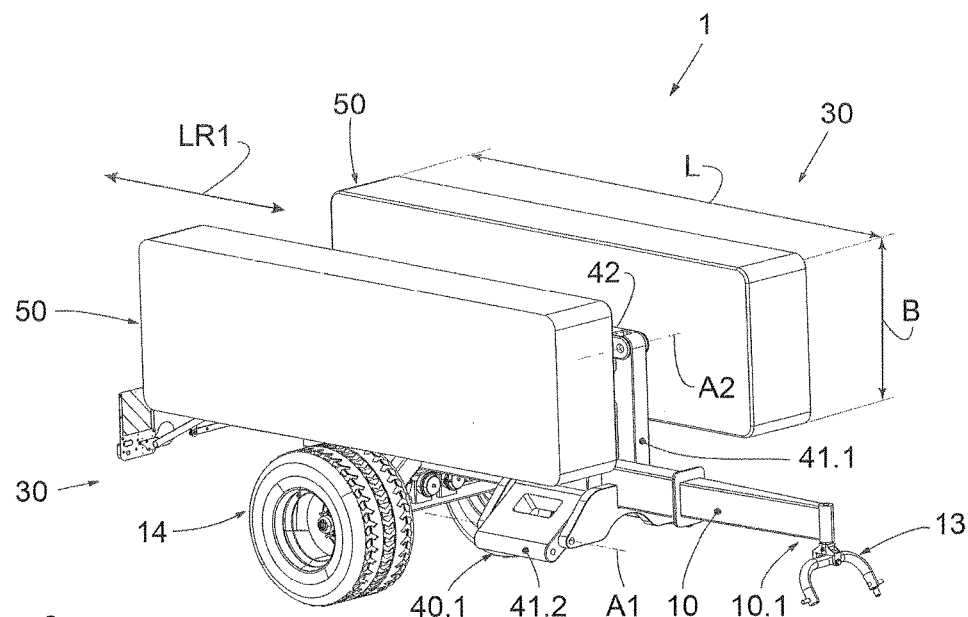
FIG. 6 presents a perspective view of the mowing device arranged in the transport position.
Figure 7:
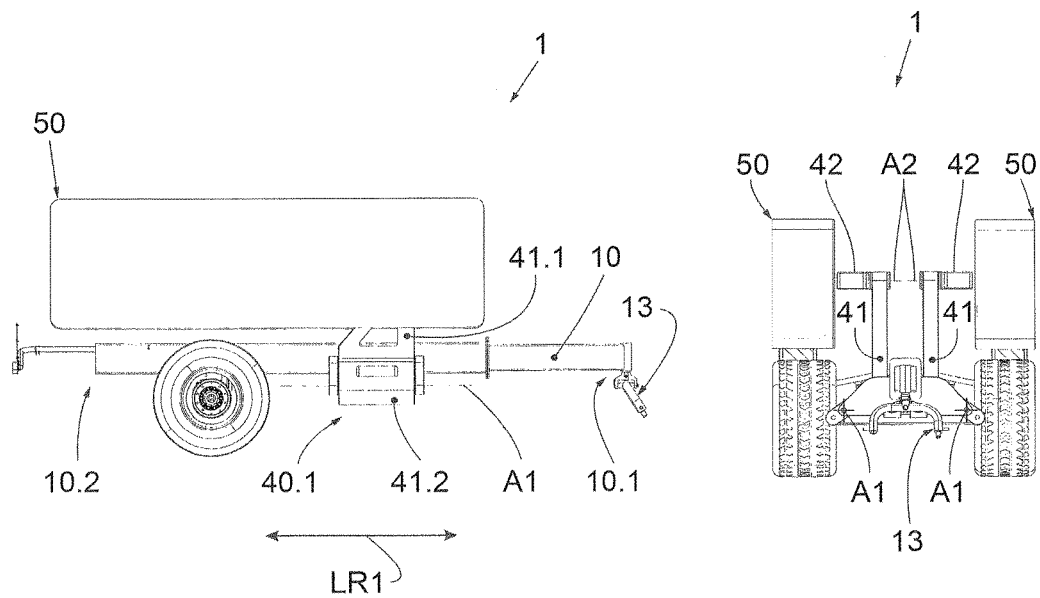
FIG. 7 presents a side view of the mowing device depicted in FIG. 6.
Figure 8:
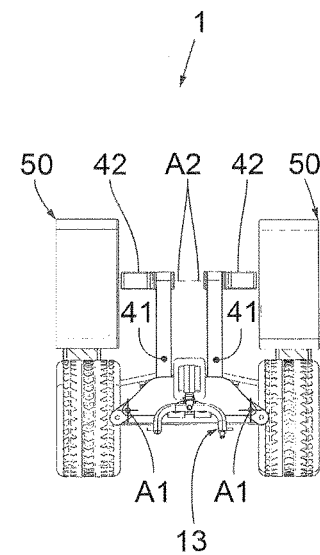
FIG. 8 presents a front view of the mowing device depicted in FIG. 6.
Figure 10:
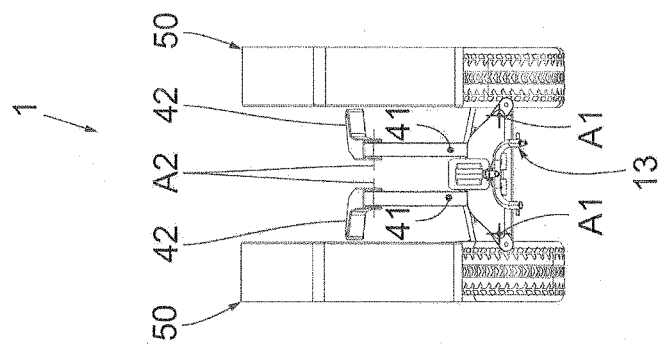
FIG. 10 presents a front view of the mowing device depicted in FIG. 9.
Figure 9:
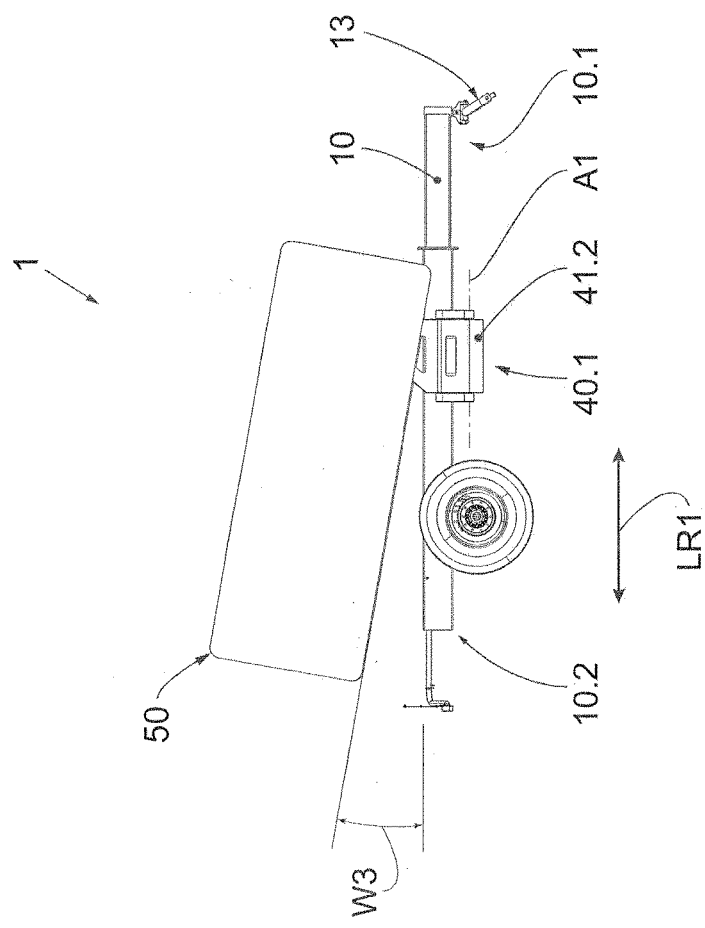
FIG. 9 presents a side view of the mowing device arranged in a modified transport position.

FIGS. 6 to 8 show the mowing device 1 and the two mowing units 30 thereof in a first transport position. FIGS. 9 and 10 show the mowing device 1 and the two mowing units 30 thereof in a modified second transport position. As is evident in FIGS. 6 to 10, in the transport position (first and second transport position), the mower 50 of each mowing unit 30 is pivoted or rotated about the second rotational axis A2 in such a way that the mower 50 extends via the length L thereof or longitudinally in the longitudinal direction LR1 of the frame 10. In addition, in the transport position, the mower 50 of each mowing unit 30 is pivoted or tilted about the first rotational axis A1 in such a way that the mower 50 extends vertically via the width B thereof, or the width B of the mower 50 has been rotated or tilted vertically.

As also is evident in FIGS. 6 to 10, in the case of each of the two mowing units 30, the lateral spacing of the first rotational axis A1 from the respective longitudinal side 11, 12 of the frame 10 is dimensioned in such a way that, in the transport position, the second leg 41.2 (disposed at the first pivot joint G1) of the first support part 41 is pivoted toward the articulating longitudinal side 11 or 12 of the frame 10, and therefore the first leg 41.1 of the first support part 41, oriented longitudinally vertically, rests against this longitudinal side 11 or 12 of the frame 10.

As also is evident in FIGS. 6 to 10, in the case of each of the two mowing units 30, the second pivot joint G2 is designed, e.g., by a suitable stop (not shown), in such a way that, in the transport position, the second support part 42 of the support 40 disposed between the second pivot joint G2 and the mower 50 is pivoted in the direction toward the rear longitudinal end 10.2 of the frame 10 and extends, via the length thereof or longitudinally, substantially in the longitudinal direction LR1 of the frame 10.

In order to bring the mowing units 30 and their respective mowers 50 out of the working position and into the transport position, the steps of a method according to the invention (referred to in the following as an operating method) described in the following are carried out for each of the mowing units 30 in order to operate the mowing device 1. In this case, depending on the need, both mowing units 30 can be simultaneously brought out of the working position and into the transport position or only one of the mowing units 30 can be brought out of the working position and into the transport position, and the other one of the mowing units 30 can remain in its current position (working position or transport position).

Figure 4:
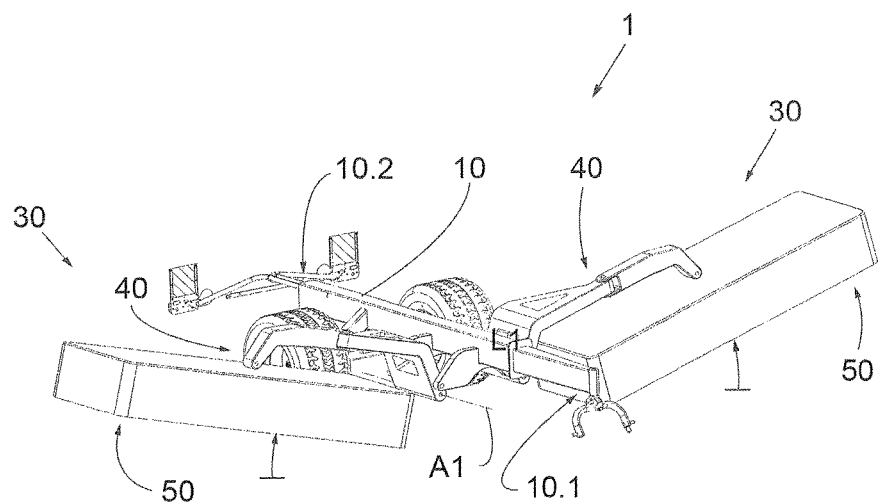
FIG. 4 presents a perspective view of the mowing device arranged in a first operating position between the working position and a transport position.
Figure 5:
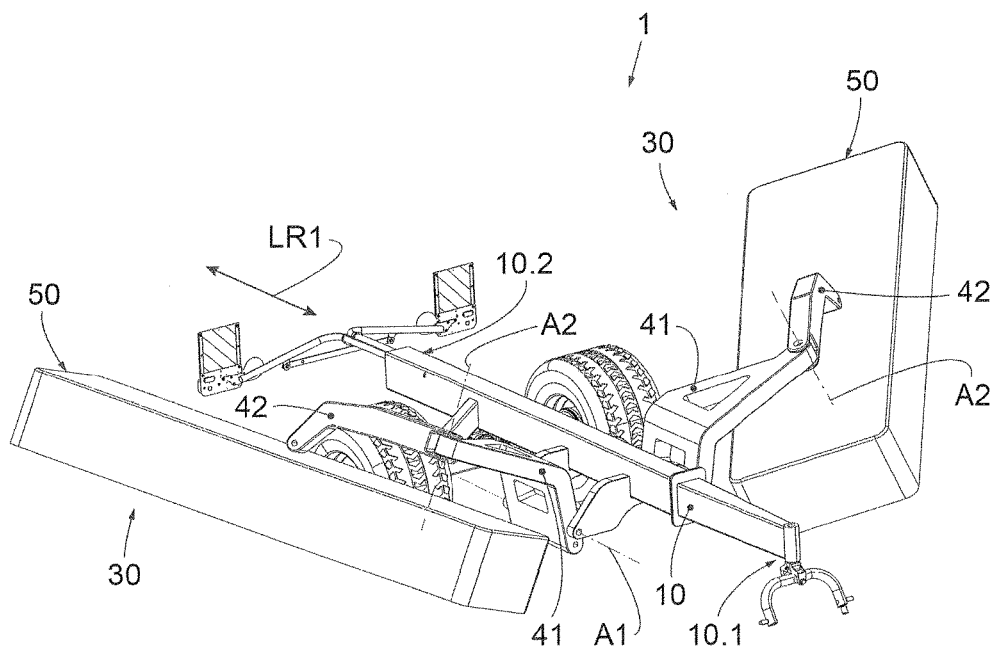
FIG. 5 presents a perspective view of the mowing device arranged in a second operating position between the working position and a transport position.

According to the operating method, in order to bring a particular mowing unit 30 out of the working position and into the transport position, in a first step, the particular mower 50 is raised into a headland position by pivoting the support 40, in the flat configuration thereof, vertically upward through a predetermined first angular pitch (e.g., approximately 15 degrees) of 90 degrees about the first rotational axis A1, as shown in FIG. 4.

In a second step, the second support part 42 of the support 40 disposed between the second pivot joint G2 and the mower 30 is pivoted toward the rear, toward the rear longitudinal end 10.2 of the frame 10, through a predetermined partial pivot angle of approximately 30 to 60 angular degrees about the second rotational axis G2. The mower is preferably pivoted toward the rear so far that said mower still has spacing from the vehicle wheel and it is possible to carry out pivoting about the first rotational axis A1 into the vertical final position of the support 40 without colliding with the vehicle wheel.

After this intermediate position is reached in the second pivot joint G2 (second rotational axis A2), in order to reach the transport position, in a third step, the first support part 41 of the support 40 or the entire support 40 is pivoted, in the configuration thereof angled through the predetermined pivot angle in the second pivot joint G2, further vertically upward through a predetermined second angular pitch (e.g., approximately 75 degrees) of 90 degrees about the first rotational axis A1 until the width B of the mower 50 has been rotated vertically.

Finally, the mower 30 is lowered with the support part 42 through a predetermined second partial pivot angle about the second rotational axis A2. The pivot angle about the second rotational axis G2 in this case is preferably in a range of 60 degrees to 90 degrees (depending on the mower).

Depending on the size of the pivot angle about the second rotational axis (60 degrees to 90 degrees), in a first variation of the transport position (having a pivot angle of 90 degrees), a lower longitudinal side of the mower 50 extends either approximately horizontally, as shown in FIG. 7 in particular. Alternatively, in a second variation of the transport position (having a pivot angle of less than 90 degrees), the lower longitudinal side of the mower 50 extends so as to be tilted vertically upward from the horizontal through a tilt angle W3 (up to approximately 30 degrees at most), as shown in FIG. 9 in particular.

While not shown, the invention intends that a support device is provided at the rear longitudinal end 10.2 of the frame 10, on which support device a rear end (in the transport position) of the lower longitudinal side of each mower 50 is placed by being pivoted slightly vertically downward about the second rotational axis A2 in order to support the mower 50 in a vibration-proof manner.

In order to bring any one of the mowing units 30 out of the transport position and into the working position, the aforementioned steps of the operating procedure are carried out in reverse order.

In the end, according to the invention, in the first or the second transport position, the mowers 50 of the mowing units 30 are disposed next to one another on edge via the respective width B thereof, and therefore a transport width of the mowing device 1 in the transport position is determined by the sum of the respective heights of the mowers 50. Since the widths B of the particular mowers 50 extend vertically in the transport position, a greater width B of the mowers 50 also is made possible when a working width is greater than 10 meters, while complying with a maximum transport height and transport width.

Finally, it should be mentioned that non-illustrated actuators are provided for all motions about the first to third rotational axes A1, A2, A3 and any locks that should be carried out, which actuators can include, for example, gearbox units and springs.

It follows that the width B of the mowing units of a towed mowing device according to the invention, in the transport position, is rotated vertically in each case, and the length L extends substantially longitudinally in the longitudinal direction of the frame in each case. In this case, the length L is tilted upward from the horizontal about a tilt angle W3 of up to approximately 30 degrees.

In the transport position, the mowing tools are preferably protrude outwardly and the mowing edge is preferably oriented upward.

LIST OF REFERENCE NUMBERS 1 mowing device
10 frame
LR1 longitudinal direction
10.1 longitudinal end
10.2 longitudinal end
11, 12 longitudinal side
13 coupling
14 wheel arrangement
15, 16 bearing bridge
30 mowing unit
40 support
LR2 longitudinal direction
40.1 longitudinal end
40.2 longitudinal end
41 support part
41.1 leg
41.2 leg
42 support part
42.1 leg
42.2 leg
50 mower
L length
B width
A1 rotational axis
A2 rotational axis
A3 rotational axis
G1 pivot joint
G2 pivot joint
G3 pivot joint
W1 internal angle
W2 internal angle
W3 tilt angle As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:
1. A mowing device for coupling to a rear of a self-propelled working machine, comprising:
an elongate frame having a front longitudinal end and a rear longitudinal end, where the front longitudinal end detachably couples to the rear of the working machine so that the frame extends longitudinally behind the working machine;

a chassis disposed on the frame with spacing from one of the front and rear longitudinal ends in order to support the frame on the ground for movement in a longitudinal direction (LR1) of the frame; and two mowing units disposed respectively on opposing longitudinal sides of the frame, wherein each mowing unit comprises:

an elongate support having a first pivot joint (G1), via which a first longitudinal end of the support is hinged on one of the opposing longitudinal sides of the frame so as to pivot about a first rotational axis (A1) extending approximately in the longitudinal direction (LR1) of the frame and approximately transversely to a longitudinal direction of the support;

a bar-shaped mower, which is hinged on a second longitudinal end of the support facing away from the first longitudinal end of the support so as to extend, in a working position of the mowing unit, longitudinally horizontally and transversely to the longitudinal direction (LR1) of the frame; and a second pivot joint (G2), which provides a second rotational axis (A2) for the support extending transversely to the first rotational axis (A1) and transversely to the longitudinal direction (LR2) of the support, about which second rotational axis the mower is pivoted, for a transport position of the mowing unit, in such a way that the mower extends longitudinally in the longitudinal direction (LR1) of the frame;

wherein, in each of the two mowing units, the second pivot joint (G2) is disposed between the first and the second longitudinal end of the support with predetermined spacing from the first pivot joint (G1) in such a way that the support is formed by two support parts that are interconnected via the second pivot joint (G2), wherein in each of the two mowing units, a first support part of the two support parts of the support, which first support part is disposed between the first and the second pivot joint (G1, G2), is angled and oriented in such a way that an obtuse interior angle (W1) of the angling thereof faces the mower and wherein a first leg of the first support part disposed at the second pivot joint (G2) extends horizontally in the working position, wherein in each of the two mowing units, the internal angle (W1) of the angling of the first support part is between 110 degrees and 130 degrees, and wherein in each of the two mowing units, a lateral spacing of the first rotational axis (A1) from each of the opposing longitudinal sides of the frame is dimensioned in such a way that, for the transport position of the mowing unit, a second leg of the first support part disposed at the first pivot joint (G1) pivots toward the respective longitudinal side of the opposing longitudinal sides of the frame until the first leg of the first support part, when oriented longitudinally vertically, rests against said respective longitudinal side of the frame.

2. The mowing device according to claim 1, wherein in each of the two mowing units, a length of the first leg of the first support part corresponds to at least half of a width (B) of the mower.

3. The mowing device according to claim 1, wherein the first pivot joint (G1) of each of the two mowing units is disposed in such a way that the first rotational axis (A1) extends adjacent to a lower longitudinal edge of each of the opposing longitudinal sides with lateral spacing from each respective longitudinal side of the opposing longitudinal sides of the frame.

4. The mowing device according to claim 1, wherein the second pivot joint (G2) of each of the two mowing units is oriented in such a way that a second support part of the two support parts of the support, which is disposed between the second pivot joint (G2) and the mower, pivots in a direction toward the rear longitudinal end of the frame opposite the front longitudinal end of the frame, for the transport position of the mowing unit.

5. The mowing device according to claim 4, wherein the second support part of each of the two mowing units is angled and is oriented in such a way that, in the working position of the mowing unit, an obtuse internal angle (W2) of the angling thereof faces the mower and a first leg of the second support part disposed at the second pivot joint (G2) extends horizontally.

6. The mowing device according to claim 1, wherein the two mowing units disposed on the two opposite longitudinal sides of the frame, in the working position, extend horizontally and via a length (L) thereof, transversely to the longitudinal direction (LR1) of the frame and, via a width (B) thereof, parallel to the longitudinal direction (LR1) of the frame; wherein the two mower units are moveable out of the working position into a transport position; and wherein the width (B) of the mowing units (30, 30), in the transport position, is rotated vertically in each case and the length (L) extends substantially longitudinally in the longitudinal direction (LR1) of the frame in each case.

7. A method for operating a mowing device according to claim 1, in order to move at least one of the two mowing units out of the working position, in which the mower extends via its width and its length (L) horizontally and longitudinally transversely to the longitudinal direction (LR1) of the frame, into the transport position, in which the width (B) of the mower (50) is rotated vertically and the mower (50) extends longitudinally in the longitudinal direction (LR1) of the frame (10), the method comprising the steps of:

raising the mower into a headland position by pivoting the support upward through a predetermined first angular pitch about the first rotational axis (A1), pivoting a support part of the two support parts of the support disposed between the second pivot joint (G2) and the mower through a predetermined partial pivot angle about the second rotational axis (A2) toward the rear longitudinal end of the frame, which is opposite the front longitudinal end of the frame (10) intended to be coupled to the rear of the working machine;

pivoting the support vertically upward through a predetermined second angular pitch about the first rotational axis (A1) until the width (B) of the mower has been vertically rotated; and pivoting the mower with the support part through a predetermined second partial pivot angle about the second rotational axis (A2), into the transport position.

* * * * *